United States Patent
Ng

(10) Patent No.: US 8,738,918 B2
(45) Date of Patent: May 27, 2014

(54) DOCUMENT EVIDENCE AND ARTICLE RETRIEVAL AND IDENTIFICATION SYSTEM

(76) Inventor: Shih Shing Ng, Selangor (MY)

( * ) Notice: Subject to any disclaimer, the term of this patent is extended or adjusted under 35 U.S.C. 154(b) by 788 days.

(21) Appl. No.: 12/020,969

(22) Filed: Jan. 28, 2008

(65) Prior Publication Data
US 2009/0193501 A1    Jul. 30, 2009

(51) Int. Cl.
*H04L 9/32* (2006.01)
*G08B 13/14* (2006.01)

(52) U.S. Cl.
USPC .................................. 713/176; 340/572.1

(58) Field of Classification Search
USPC .................................. 713/176; 340/572.1
See application file for complete search history.

(56) References Cited

U.S. PATENT DOCUMENTS

| | | | |
|---|---|---|---|
| 6,431,438 B1 * | 8/2002 | Pires et al. | 235/375 |
| 6,707,381 B1 * | 3/2004 | Maloney | 340/568.1 |
| 6,788,997 B1 * | 9/2004 | Frederick | 700/236 |
| 7,336,174 B1 * | 2/2008 | Maloney | 340/572.1 |
| 7,986,237 B2 * | 7/2011 | Jung | 340/572.1 |
| 2001/0006368 A1 * | 7/2001 | Maloney | 340/568.1 |
| 2007/0265994 A1 * | 11/2007 | Ueda | 707/1 |
| 2009/0002128 A1 * | 1/2009 | Jung | 340/10.1 |

* cited by examiner

*Primary Examiner* — Teshome Hailu
(74) *Attorney, Agent, or Firm* — Symbus Law Group LLC; Clifford D. Hyra

(57) ABSTRACT

The invention involves document evidence and article retrieval and identification system which provides solution to track a document, or article within a control environment. This solution provides the integrated human identity, embedded tracking devices into physical evidence record to enable tracking of movement by authorized person or personnel. The system is capable to capture and track the activities life cycle of the document, evidence, file or article life cycle using the tracking management system server. This invention provide highly security feature to integrate human identity for access authentication interrogative with the confidential document or evidence or file or article.

12 Claims, 2 Drawing Sheets

DOCUMENT EVIDENCE AND ARTICLE RETRIEVAL AND IDENTIFICATION SYSTEM

FIELD OF THE INVENTION

The present invention provides the tracking solution to the document evidence and article retrieval and identification system which is capable to track and authenticate each transit point for the document or article movement. The system provides the verification and authentication process to identify personal identity using secure interrogative procedures for access permission. Therefore the present invention to provide solution which is to adapted with highly secure physical security with embedded chip and radio frequency antenna technology to prevent the confidential document, evidence, article from being misplaced, stolen and lost in transit.

BACKGROUND OF THE INVENTION

Misplace of critical s, evidence is one of the greatest problems in today's marketplace, household, museum, government offices, company and legal entity. Traditionally the problem is resolved by assigning the special workforce to search the missing or misplaced s. However until today this problem remains the main issue and concern is increasing as many persons that handle the documents and confidential articles, particularly for evidence keeping. There is limitation with the effectiveness to track manually. One faces common problems such as, spending too much time on searching and consuming a lot of labor and energy to allocate or pulling entire search documents or articles from the specific or various suspected locations. The problem may be more perplexing when the important document or article has been lost, misplaced and stolen. Therefore, a few solutions has be invented and to resolve and help to overcome such problem.

Currently numerous intelligent tracking solutions to track documents are using bar code tracking system also many begin to use radio-frequency identification (RFID) tag.

The existing intelligent tracking solution usually comprises the devices such as;

Bar code label which attached in physical label form to each document or article and it comprises; a printed bar code to represent the information of the document or article. The bar code requires optical scan device to capture the bar code numbering.

Electronic tag which attached RFID transponder to a sticker to make as RFID label to stick to each document or article and it comprises; a programmable chip to store the identity information of the document or article. The electronic tag will be read automatically by the designated electronic tag reader.

Bar code scanner emits the optical light to scan bar code label and capture bar code information for the documents or article. A document or article needs to be scanned by the optical scanner physically with certain reading distance to capture information from the preprinted bar code area on each transaction. Whenever the scanning is done on each transaction, the system will update to the linked database server.

Electronic tag reader whereby this device is used to read or activate electronic tags in order to check the documents or article for each transaction in and out of a designated area. A document or article need to be read by electronic reader to interrogate information in the memory chip of the electronic reader before and after each transaction itself. When ever the electronic identity tag of the document or article has been processed, there is a signal response to update the system or linked database server.

Mobile electronic tag reader; this is a mobile device which can be used to read and track documents or article in each shelve. The device identifies the items tag with RFID tag and some with built in application to track inventory. It has capability to store the directory and inventory information of the document or article.

The foregoing intelligent tracking solutions benefit the users in terms of;

Provide high speed and more effective document or article tracking solution, compared to the traditional method manual search.

Provide the systematically solution to track, locate and manage the document, evidence, files, articles and any other items of value.

Provide the better security protection to the confidential document or article.

Avoid document or article being lost, misplace and stolen.

However there were limitations with the existing intelligent tracking solutions such as;

The existing solution is not designed with close loop feedback system which is integrated with personal identity; therefore it not capable to provide the life cycle management with high security control and effective tracking.

It allows the tampering problem to happen. For example the bar code or electronic tag can be tampered, and it is easy to be transferred or recycled.

The existing solutions cannot track the document or article by verification with human identity to prevent unauthorized person or personnel holding or handling the document or article. Subsequently the system fails to track the document or article when the document or article has been misplaced, stolen and lost.

There is no real time feedback on when or how the event happens, when the person or personnel consume more time on the document or article than the assignment period.

There is no real time monitoring and feedback procedure for person or personnel log in and out from the document or article storage room, shelve or work station.

There limitations of capturing multiple transactions happening at the same time.

There are limitations for the existing electronic tag whereby if the document or article are located too close to one another, and the electronic tag is not able to respond correctly due to interference.

There are limitations in capturing all electronic tag or bar code label if the quantity range of hundreds and thousands of electronic tag or bar code labels at a single interrogative There are limitations in response time or reading speed whereby not all documents or article are able to read accurately at the shorter time in the case of many electronic tags in the quantity range of hundreds and thousands at a single interrogative The disclosure herein will focus on the document evidence and article retrieval and identification system which provides the alternative solution to track the document, or article more effectively and with higher security protection.

SUMMARY OF THE INVENTION

The present invention of document evidence and article retrieval and identification system provides a close loop system to track the document or article within the designated control environment with integration high security to increase efficiency. The document evidence and article retrieval and identification system comprising the higher security access control without compromising the potential tampering factor.

Evidence document and article retrieval and identification system is invented to provide the functionality and secure tracking system such as;

Document or article storage area which is a special design with electronic control cabinet, shelves or store area, which stores the document or article which consists of embedded chip and antenna.

The document or article storage area comprising; special locking mechanism that integrated to verification and authentication with document access device. These features provide the high security access control to higher level of authorized permission to person or personnel. Only the authorized person is allowed access to the approved document, evidence or filing location. The storage area is adapted with a display unit to indicate the content of the person or personnel access permission and with embedded chip and antenna document or article location that allow to access. Document or article storage area is linked and interfaced direct to document evidence and article retrieval and identification system which is capable to update the content information of each activity with time stamp to the server. The embedded chip and antenna document or article also is designed to carry stored information according to the sequence and individual profile. The storage area comprising various compartments for storage of the document or article and each compartment has built in sensor or reader antenna to verify if the is allocated or dislocated in the position. If the is misplaced, lost, intercepted or missing, the sensor or reader will provide immediate response to the server and activated signal which can be in the form of sound and signal feedback to the administrator alternatively signal to activate short message via mobile phone. The storage area is also adapted with the special designed electromechanical locks that verify and authentically access of the user using personal identity or biometric identity matching to the access permission to document or article storage area. The document or article storage area is linked lively to the application server, whereby the response, motion and status of the content is updated and reported to the server at real time.

The embedded chip and antenna document or article comprising a temper proof embedded chip and antenna on the document or article which are not visible to human naked eye. It functions as communications device attached to the. The embedded chip and antenna has the capability to store the information such as authorized person or personnel profile and document or article information and location point and other information according to user define. The embedded antenna allows the embedded chip to communicate direct to document access device located in the document or article storage area that under access control. Whenever the embedded chip and antenna document or article has been relocated or taken out from the document or article storage area the embedded chip and antenna document or article will be captured to update the record by the document access device. Then document access device will update the content information of the document or article storage area status and acknowledge the evidence document and article retrieval and identification system.

The personal authentication device is a personal identity or mobile device play the role as an access key to give access permission to the authorized person or personnel to access to document or article storage area.

The personal authentication device was issued by the system administrator to the approve person or personnel to allow access to the storage area with optional access permission direct to document or article storage area via web internet to enable monitoring of the status. Personal authentication device is programmed and stored with personal identity information of the authorize user, the life tracking of authorized personnel authentication device and access history of the each attempt shall be recorded and all documents or articles information that is required is captured. Personal authentication device is requiring communication to perform interrogative with document access device in order to access to document or article storage area. According to the record information program the person or personnel's identity, after successful authentication procedure which is to store the information of personal authentication device, document access device will give the permission to the authorized person or personnel to access to the designated document or article. The communication between personal authenticate device and document access device ensures that only the authorized person or personnel can access to the right document or article location.

Web-based accessible; the invention provides the web base accessible solution for the authorized person to access to the document or article information or image via access to document and article retrieval and identification system, this person allow to request or engage the work on the document or article via internet. This feature allows the authorized person to engage work on the document or check the document or article status at any time and any place.

Document life cycle management system server; the server will link to the document or article storage area and all work stations. It plays the main role to store the entire document or article information which includes the life cycle, progression of the document or article that been accessed at real time. The server can be accessed by the authorized person or personnel only. The server is connected and linked to all workstations and accessible through the internet. The server also stores the information of personnel identity who works on the document or article. The server will track and record the information of the document or article life cycle at real time, which includes when, who and what, where the document or article has been removing, relocated. Every change on the document or article will be captured and recorded by the server. The server can be linked to sms server that is capable to trigger sms or video message to send to the administrator or similar services linked to update the file requester or reminder for the person to return the file or article or when intruder is detected.

The architecture of the document evidence and article retrieval and identification system provides the close loop feedback control system which enables the management team or enforcement team to monitor closely on the work flow and progress on the document or article and is also capable to track the document or article effectively at real time via internet, intranet or mobile phone services.

DETAILED DESCRIPTION OF THE PREFERRED EMBODIMENT

Figure 1:
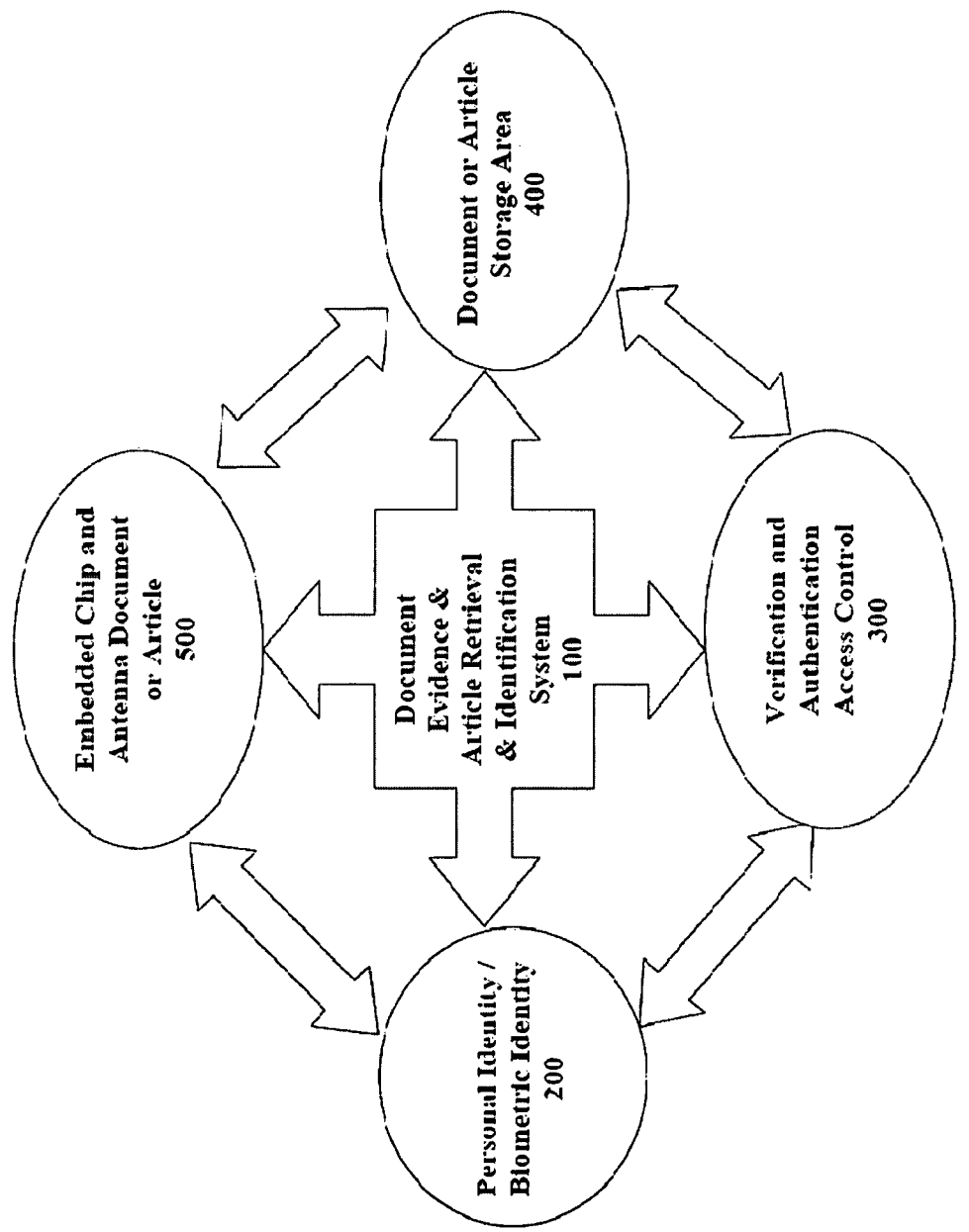
FIG. 1 illustrates overall document evidence and article retrieval and identification system.

Embodiment of the present invention will now be described more fully hereinafter with the reference to the accompanying drawing, in which not all the embodiment of the invention are shown. Indeed, the invention may be embodied in many different forms and should not be construed as limited to the embodiments set forth herein: rather these embodiments are provided so that this disclosure will satisfy applicable legal requirements. Like reference numerals refer to like elements throughout.

FIG. 1 Represent an overall document evidence and article retrieval and identification system herein the explanation of the system.

The document evidence and article retrieval and identification system 100 is integrated and connected with 4 major components which is represented by personal identity or biometric identity 200 to identify person or personnel who require to access to the system. The verification and authentication access control 300 is the process to verify and authenticate person or personnel in order to enable or disable access to the system. The document or article storage area 400 is the storage area equipped with feedback and constant communication antenna device to store confidential documents or articles that prevent free access, and usually is located in a control environment to only allow restricted access. The entire system connected close looped with the embedded chip and antenna or article 500 that allow real time monitoring by the system. The document evidence and article retrieval and identification system 100 are linked with wire or wireless network to enable real time update and feedback to the server and all link components.

Figure 2:
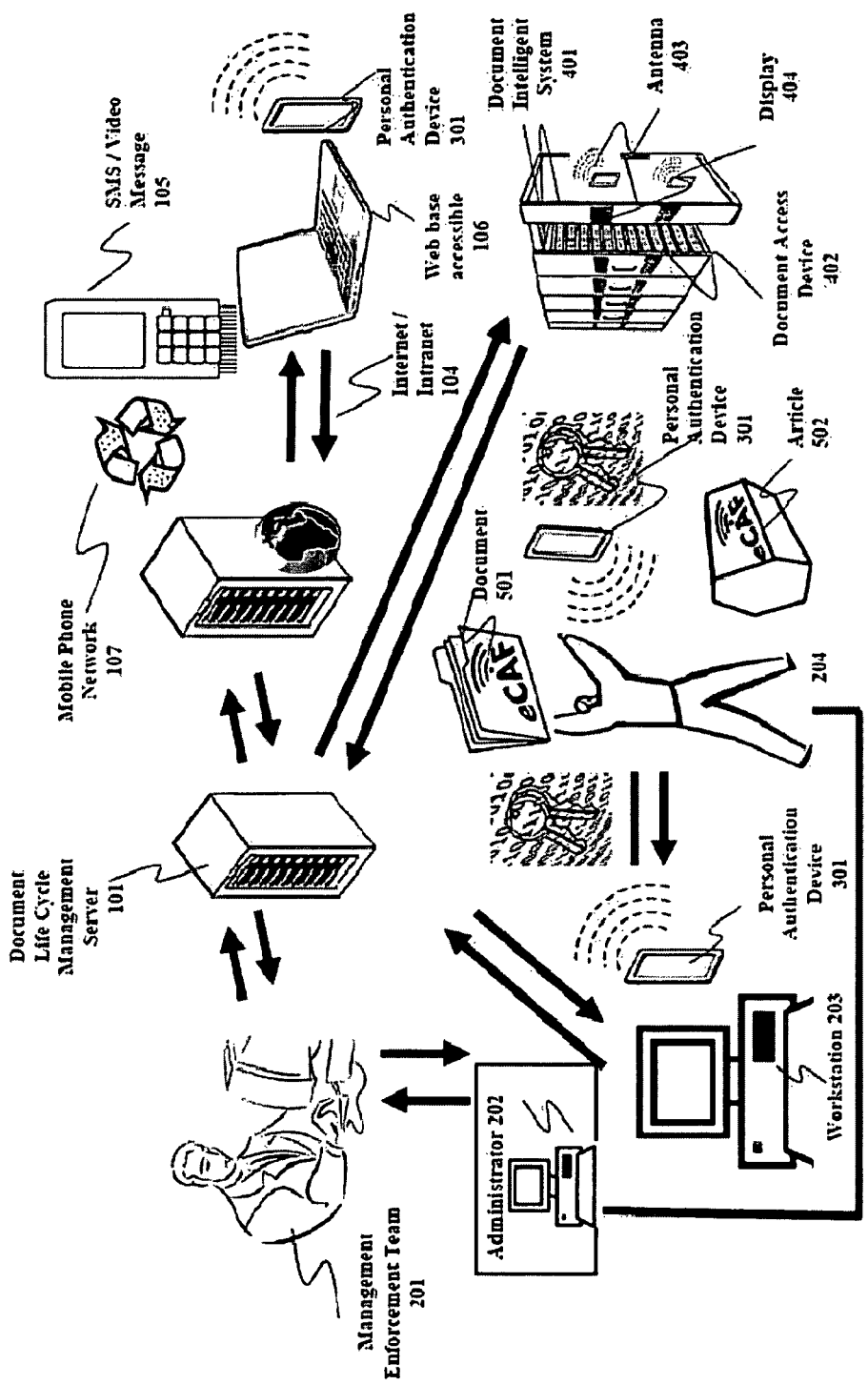
FIG. 2 illustrates an overview process flow for the close loop of document evidence and article retrieval and identification system.

FIG. 2 Represent an overview process flow for the beginning to the ending of document evidence and article retrieval and identification system 100 in FIG. 1. Management and enforcement Team 201 have the right to access to entire system area including the database server. The management and enforcement team 201 are given the roles and responsibility to assign to distribute the access right to the person 204. The management and enforcement team 201 authorize the area of the content that is accessed by the personnel. The management and enforcement team 201 empower the administrator 202 to distribute the task and access right to person or personnel 204. The administrator 202 plays the main role to monitor and maintain the system work flow and progress on document or article allocation or relocation. Upon approval by management and the enforcement team 201 the administrators 202 shall distribute the access right and task to the person 204. Administrator 202 shall issue personal authentication device 301 which is being personalized with personal identity or biometric identity information which can be in the form of smartcard, mobile terminal or programmable key devices. The personal authentication device 301 will allow the person to access to the document 501 and article 502 according to the order, job function and necessary. The person or personnel 204 uses the personal authentication device 301 to interrogate with the document access device 402 on the document intelligent system 401. Document access device 402 carries stored information of list of persons 204, that allowed or permitted to attain to the document 501 or article 502 from the document intelligent system 401. The display on the document intelligent system 401 will indicate the document 501 or article 502 directories and locations. Then the lock mechanism of document intelligent system 401 will be unlocked and allow the person or personnel to attain the document 501 or article 502 from the document intelligent system 401.

Document intelligent system 401 is a high secure storage area that is designed for keeping document 501 or article 502, document intelligent system 401 is linked and has direct access via network to the document life cycle management server 101. Document intelligent system 401 with built in sensor and RFID reader antenna 403 is capable to capture the movement activities of document 501 or article 502 locations. Authorized person or personnel 204 with personal authentication devices 301 is allow access to the designated working directory in the document intelligent system 401. The document access device 402 verifies and authenticates the person or personnel and is linked to a display unit 404 which provides interactive information regarding the person or personnel's 204 access right ; storage position, search location for the document 501 or article 502 and with complete layout display allow access guide to open the document intelligent system 401. The system allow document 501 or article 501 set the boundary where is the area that is allowed to move within the specific area. If the document 501 or article 502 moves beyond the specific control boundary or when intruder is detected, the system will produce the notification and report to the life cycle management server 101 and the administrator can set the feedback either by activating the alarm or signaling to trigger mobile short message or mobile video massage 105 using the linked mobile phone network 107. After the person or personnel 204 is allowed to access or remove the document 501 or article 502 from the document intelligent system 401, the document intelligent system 401 will send an updated information to the document life cycle management server 101. The system can also set to trigger mobile short message or mobile video message 105 using mobile phone networks 107 to inform the relevant parties on reminder for the person to return the document or article.

Alternatively the person or personnel 204 can engage to access to the information of document 501 or article 502 via standalone workstation 203. The person or personnel will have to be present with personal authentication devices 301 to go through verification and authentication process using biometric identification on the person or personnel at the workstation 203 in order to allow access to information on document 501 or article 501.

The personal authentication devices 301 will be the keys to open access to work on the specific working directory. The workstation 203 allows the authorized person to access to the server information only when the verification of the person or personnel identity is successfully done. With this access the person or personnel 204 can also submit request to work or access to the information of the document 501 or article 502.

Workstation 203 is connected with document life cycle management server 101. Document life cycle management server 101 will store the document 501 or article 502 information which includes the document past and present status, the history of document 501 or article 502 that been edited.

The document life cycle management server 101 can be accessed by the management team and authorized person or personnel only. The document life cycle management server 101 is connected and link to the workstation and also accessible through the internet 104. The document life cycle management server 101 also stores the information of person or personnel access information like personal and biometric identity. The document life cycle management server 101 will track the information of the document 501 or article 502 life cycle, which, when, who, how and what is the document 501 or article 502 that has been worked on or in transit. Every change on the document 501 or article 502 will be captured and recorded by the document life cycle management server 101.

The document life cycle management server 101 is accessible by the authorized user through the internet 104. The authorized person or personnel is permitted to continue to work or access on the document 501 or article 502 information via personal authentication devices 301 to go through remote or online verification and authentication process using biometric identification on the person or personnel at the notebook computer or web base accessible whereby internet 104 facility is provided. This is convenient to provide the flexible working environment for the authorized person or personnel; it allows the authorized person or personnel to access and work at any time and in any place. However the amount of information access on document 501 or article 502 via web base accessible 106 shall be determined or approved by the management and enforcement team 201. The authorized person or personnel shall attain a personal authentication device 301 which can be in the form of radio frequency biometric identity card, smartcard, mobile terminal, programmable key chain, any miniature mobile device, mobile phone with embedded chip and antenna using near field communication technology from the administrator 202 which functions as a key to access to the workstation 203 or web base accessible 106.

What is claimed is:

1. A document evidence and article retrieval and identification system comprising;
   a personal or biometric identity configured to identify a person requiring access to the system;
   a verification and authentication access control configured to verify and authenticate persons attempting to access the system, in order to enable or disable access to the system;
   a document or article storage area comprising one or more sensors or reader antenna; and
   a plurality of embedded chip and antenna documents and/or articles;
   wherein the document or article storage area is configured to continuously track and record in real time a status of the documents and/or articles, including who possesses the documents and/or articles, the location of the documents and/or articles, and associated times, by communicating with embedded chips in the embedded chip and antenna documents and/or articles, wherein the documents and/or articles are confidential objects to which access is restricted, and wherein different of the documents and/or articles are permitted to be attained by different persons;
   whereby a closed-loop integrated security technology for retrieval using a secure verification and authentication process is achieved,
   wherein the embedded chip and antenna document or article comprises a chip and antenna embedded integrally in its body material or surface material that uses radio waves for communication and is not visible to a human naked eye,
   wherein the system is configured to provide for high accuracy communication with a plurality of frequency modes without interference in the presence of up to thousands of embedded chip and antenna documents or articles located far from or proximately to one another.

2. The system of claim 1, further comprising a link to a network environment.

3. The system of claim 1, wherein the document or article comprises a file, magazine, evidence record, confidential document or file, government document, record file, or hard copy.

4. The system of claim 1, wherein the personal or biometric identity comprises personal or biometric identity data stored in the form of an electronic key for access control to the storage area.

5. The system of claim 4, wherein the electronic key is stored into electronic programmable personal authentication devices comprising one or more of a smartcard, mobile terminal, programmable key chain, or any miniature mobile device or mobile phone with embedded chip and antenna using near field communication technology.

6. The system of claim 1, wherein each document or article has an individual boundary associated with it, within which it is allowed to be used, at least two of the documents or articles have different associated individual boundaries, and a notification is sent if one of the documents or articles moves outside of its individual boundary.

7. A life cycle management system comprising;
   a link to a plurality of work stations,
   a plurality of mobile document access devices,
   a plurality of web-based accesses via an internet connection,
   a link to a mobile phone network,
   a plurality of mobile personal authentication devices each corresponding with a user; and
   a life tracking server configured with application software configured to track, record and store real time movement of an embedded chip and antenna document or article throughout its life cycle within a controlled environment, including who possesses the document or article, the location of the document or article, and an associated time, such that every change in the document or article's status over its life cycle is captured and recorded,
   wherein the embedded chip and antenna document or article comprises a chip and antenna embedded integrally in its body material or surface material that uses radio waves for communication and is not visible to a human naked eye,
   wherein the system is configured to provide for high accuracy communication with a plurality of frequency modes without interference in the presence of up to thousands of embedded chip and antenna documents or articles located far from or proximately to one another.

8. The system of claim 7, wherein the life tracking server is configured to capture and set an authorized access time and allowable movement boundary for a document or article.

9. The system of claim 7, wherein the plurality of work stations comprises a plurality of stand-alone access computer terminals that authorize users with authorized mobile personal authentication devices to access system information.

10. The system of claim 7, wherein the plurality of mobile document access devices are integrated with a plurality of antenna to continuously capture real time information to update a document or article life cycle, time stamp, location, access status, audit trail, inventory, and record.

11. The system of claim 7, wherein the plurality of web-based accesses allow all users with authorized mobile personal authentication devices to access system information or query for document or article information via the internet.

12. The system of claim 7, wherein the link to a mobile phone network is configured to send an sms or video message to a user or subscriber to transmit a status, reminder or alarm for any system fault report or when an intruder is detected.

* * * * *